United States Patent [19]

Fourezon

[11] Patent Number: 5,180,633
[45] Date of Patent: Jan. 19, 1993

[54] COMPOSITE TEXTILE MATERIAL CAPABLE OF BEING EMPLOYED FOR RESIN REINFORCEMENT

[75] Inventor: André Fourezon, Ardéche, France

[73] Assignee: Establissements les Fils D'Auguste Comarat & Cie, France

[21] Appl. No.: 628,430

[22] Filed: Dec. 14, 1990

[30] Foreign Application Priority Data

Dec. 22, 1989 [FR] France .................. 89 17393

[51] Int. Cl.$^5$ .................. B32B 3/06; B32B 5/06; B32B 5/22
[52] U.S. Cl. .................. 428/300; 428/102; 428/234; 428/238; 428/251; 428/252; 428/298; 428/299
[58] Field of Search ........... 428/298, 299, 300, 102, 428/234, 238, 251, 252

[56] References Cited

U.S. PATENT DOCUMENTS

| | | | |
|---|---|---|---|
| 3,669,158 | 6/1972 | Phillips | 139/420 |
| 3,975,565 | 8/1976 | Kendall | 428/284 |
| 4,576,858 | 3/1983 | Fourezon | 428/300 |
| 4,931,358 | 6/1990 | Wahl et al. | 428/300 |

FOREIGN PATENT DOCUMENTS 765153 3/1955 United Kingdom .

*Primary Examiner*—George F. Lesmes
*Assistant Examiner*—K. E. Shelborne
*Attorney, Agent, or Firm*—Wall and Roehrig

[57] ABSTRACT

Composite textile material for the production of composite articles, consisting of a multilayer structure, the various layers being joined together by needling.

It is characterized in that it comprises at least two woven layers:
one of which is based on yarns with high mechanical performance (for example aramid);
and the other of which is based on yarns of another kind and more particularly continuous filament glass yarns, the two woven layers being bound together by needling so that a minor part of the high mechanical performance fibres is implanted within the woven glass yarn structure.

4 Claims, No Drawings

COMPOSITE TEXTILE MATERIAL CAPABLE OF BEING EMPLOYED FOR RESIN REINFORCEMENT

BACKGROUND OF THE INVENTION

In the field of the production of materials based on resin reinforced by a fibrous structure, which materials in the description which follows will be referred to by the expression "composite materials", apart from conventional fibres such as glass fibres which have been employed for decades, it has now been proposed to employ so-called "high mechanical performance" fibres, especially aramid fibres, carbon fibres etc.

In general, such textile reinforcements based on high mechanical performance fibres are in the form of balanced or unbalanced fabrics. A disadvantage of these fabrics, however, is the fact that they are very easily deformed, and, when the composite materials are being produced, this results in a disorientation of the fibres and consequently in inhomogeneous characteristics.

Furthermore, it has been proposed for a long time to produce so-called mixed reinforcing fabrics, as follows from FR-A-2,034,787, in order to combine the specific properties of substances of different kinds. Thus, in the abovementioned document a fabric is produced, comprising, as warp, strands of glass fibres and of carbon fibres, alternating and bound together by binding wefts.

However, with a solution of this kind it is difficult to obtain thick reinforcements.

There are also known mixed composites consisting of needled felts based on a mixture of fibres, as follows from FR-A-2,248,937. While such felts have the advantageous characteristics of being easily formed, they nevertheless have the disadvantage of not imparting high strengths in the lengthwise, transverse or other direction.

There has now been found, and this is what forms the subject of the present invention, an improvement introduced into the textile reinforcements in the form of fabrics based on aramid fibres (or any other similar material) which not only makes it possible to preserve the characteristics of the said fibres in the composite material, but also improves the adhesiveness properties of the said substance to the resin, more particularly when a polyester resin is involved, and which removes any risk of delamination which might occur.

SUMMARY OF THE INVENTION

In general, the composite textile material according to the invention for the production of composite articles consists of a multilayer structure, the various layers being joined together by needling (a technique employed for decades for binding together a number of textile structures), and it is characterised in that it consists of at least two woven layers:
one of which is based on yarns (warp and weft) with high mechanical performance, especially aramid;
and the other of which is based on yarns of another kind, and more particularly continuous filament glass yarns;
the two woven layers being bound together by needling so that a minor part of the high mechanical performance fibres is implanted within the woven glass structure.

It was found that, to obtain good results, it was necessary to employ a light needling not damaging the structure of mechanical performance fibres and that, furthermore, the elementary yarns, both of the glass sheet and of the mechanical performance fibre sheet must be yarns without any twist, exhibiting a relatively planar and aerated structure.

Such a composite material makes it possible to obtain composite materials, especially polyester resin-based, exhibiting excellent characteristics due to the fact that it is found that the risks of delamination are eliminated, it is possible to produce considerable stacks of reinforcements and that, furthermore, the orientation of the elementary yarns is not perturbed in the course of handling operations, the said filaments being kept perfectly positioned against the glass support fabric.

DESCRIPTION OF THE INVENTION

To produce such a composite, any kind of known needling hardware will be employed, such as, for example, needling machines with barbed needles, or needling machines with jets of fluid (air or water). Since a technique of this kind is conventional, it will therefore not be described in detail in the description, in the interest of simplification.

EXAMPLE

A composite material for producing a composite article in accordance with the invention is produced from two fabrics, one of which is based on glass yarns and the other is based on high mechanical performance yarns, these two fabrics being coupled by needling and this being done so that the action of the needles is such that it makes a minor part of the high mechanical strength yarns enter within the woven glass yarn support.

The glass fabric is a slack fabric, of cloth weave, consisting of glass strands woven at average of approximately one strand per centimeter as warp and two strands per centimeter as weft, at a rate of 420 grams per square meter of warp yarns per 420 grams per square meter of weft yarns.

The high mechanical performance yarn fabric, for its part, is also a cloth weave fabric and is produced from yarns marketed under the trademark "Kevlar" ® by Du Pont de Nemours, also in the form of strands, but the warp and weft density being higher than in the case of the glass support, being, in the present case, approximately three warp yarns and three weft yarns per centimeter, the quantity of warp and weft yarns being balanced in the fabric and of the order of ninety grams per square meter in the case of the warp and in the case of the weft.

Such a composite material is not only easy to handle but it makes it possible to ensure a perfect maintenance of orientation of the high mechanical performance yarns. It can be employed as reinforcement of polyester resin and it has been found that a composite substance is obtained exhibiting very good mechanical characteristics and that, furthermore and above all, the risks of delamination are practically completely eliminated.

Furthermore, since the thickness of the reinforcing composite in accordance with the invention is markedly greater than in the case of mixed fabric (alternation of glass yarns and of another type of yarns both as warp and as weft in a fabric), and being of the order of 1.4 millimeters in the present case, the characteristics of the composite material formed are improved.

The invention is obviously not restricted to the example of embodiment described above, but covers all its alternative forms produced using the same concept.

I claim:
1. A composite material having a planar, aerated structure, for use in the production of composite structures that includes:
   a multi-layered structure consisting essentially of at least two superimposed woven yarn layers, one of said yarn layers being formed of non-twisted glass filaments and the other of said yarn layers being formed of non-twisted strands selected from the group consisting of aramid and carbon fibers having a higher mechanical strength than the glass filaments; and
   needling means for joining the two woven layers so that a portion of the strands of high mechanical strength are implanted within the glass filament yarn.

2. The composite material of claim 1 wherein the strands of higher mechanical strength are formed of aramid fibers.

3. The composite material of claim 1 wherein both yarn layers have a warp and a weft which contain the same weight of material per unit area and wherein the weight of material per unit area in said one woven yarn is about three times that of the material per unit area in said other woven yarn.

4. The composite material of claim 3 wherein said one woven yarn contains 420 grams per square meter of warp filament per 420 grams per square meter of welt filament and said other woven yarn contains 90 grams per square meter of warp strands per 90 grams open square meter of welt strands.

* * * * *

UNITED STATES PATENT AND TRADEMARK OFFICE
CERTIFICATE OF CORRECTION

PATENT NO. : 5,180,633
DATED : January 19, 1993
INVENTOR(S) : Andre Fourezon

It is certified that error appears in the above—identified patent and that said Letters Patent is hereby corrected as shown below:

Col. 4, line 12 and line 15, each occurrence, "welt" should be

--weft--.

Signed and Sealed this

Thirtieth Day of November, 1993

Attest:

BRUCE LEHMAN

Attesting Officer

Commissioner of Patents and Trademarks